UNITED STATES PATENT OFFICE.

FREDERICK G. NIEDRINGHAUS AND WILLIAM F. NIEDRINGHAUS, OF ST. LOUIS, MISSOURI.

IMPROVEMENT IN ENAMELING SHEET-IRON WARE.

Specification forming part of Letters Patent No. 199,735, dated January 29, 1878; application filed November 17, 1877.

*To all whom it may concern:*

Be it known that we, FREDERICK G. NIEDRINGHAUS and WILLIAM F. NIEDRINGHAUS, residents of St. Louis, Missouri, have made a new and useful Improvement in Enameling Sheet-Iron Ware, of which the following is a full, clear, and exact description.

We have heretofore made an improvement in enameling sheet-iron ware by causing an oxidation of the metallic base during the enameling process, and by means of the acid present in the ingredients of which the enameling-glaze is composed.

As a rule, the acid already contained in the ingredients is amply sufficient for the perfect oxidation of the base; but occasionally, from insufficient smelting of the ingredients, or from imperfect grinding thereof, or from some of them being inferior in quality, the enameling glaze or paste, as an oxidizing agent, is not energetic enough in its action on the base. We overcome this difficulty by adding a liquid acid to the paste after the latter has been prepared in the ordinary way. Any of the well-known liquid acids that act on iron will answer.

If sulphuric acid is used, a tea-spoonful to one hundred pounds of the paste suffices to produce an effect in the desired direction, and more can be used, as preferred. By this means the glaze or paste is enabled to act on the metallic base with the desired effect.

We claim—

The combination, with the ordinary glaze used in making mottled enameled sheet-iron ware, of sulphuric or equivalent liquid acid, substantially as and for the purpose described.

Witness our hands.

F. G. NIEDRINGHAUS.
WM. F. NIEDRINGHAUS.

Witnesses:
CHAS. D. MOODY,
SAML. S. BOYD.